Figure 1:
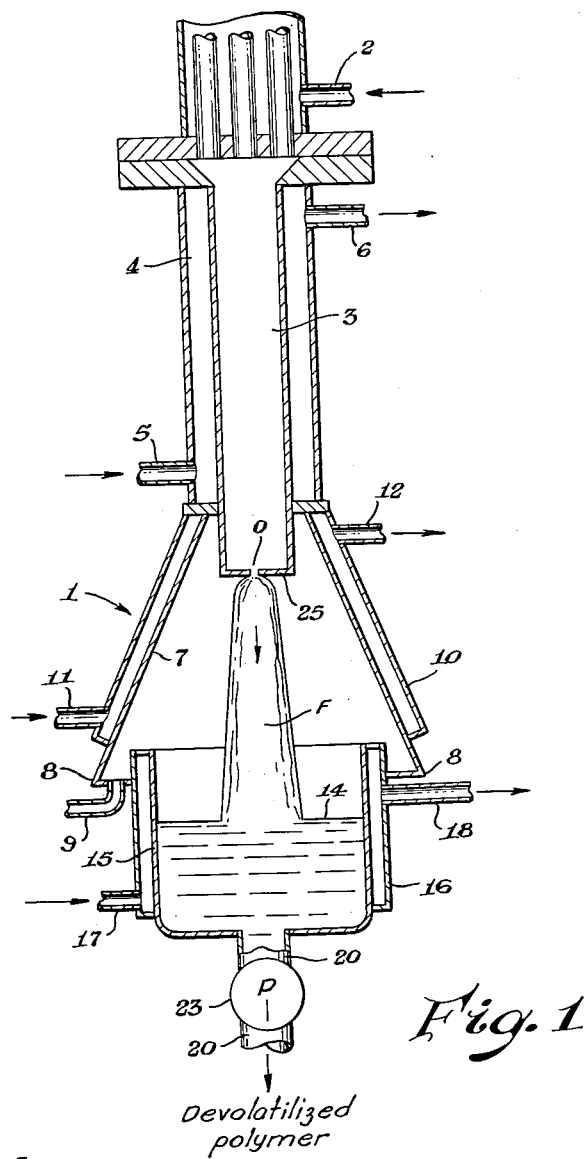

Devolatilized polymer

INVENTORS.
Wilson W. Hunt
Samuel G. Ludington
James L. Amos

BY Griswold & Burdick
ATTORNEYS

United States Patent Office 3,004,900
Patented Oct. 17, 1961

3,004,900
APPARATUS FOR DEVOLATILIZING
Wilson W. Hunt, Samuel G. Ludington, and James L. Amos, Midland, Mich., assignors to The Dow Chemical Company, Midland, Mich., a corporation of Delaware
Filed Jan. 9, 1957, Ser. No. 633,317
10 Claims. (Cl. 202—191)

This invention relates to an improved apparatus for devolatilizing polymeric compositions, particularly those that are comprised of such alkenyl aromatic polymer compounds as polystyrene, polyvinyltoluene and the like, to rid them of undesirable volatile constituents including monomers, low molecular weight polymers, and various gases that may be present.

The fugacious constituents of freshly prepared polymeric compositions are generally removed while the composition is in a molten or otherwise liquid condition and is being held in or passed through a devolatilizing chamber which allows the escaping volatiles to freely contact most of the hot, bare metal walls of the chamber. Such contact of the usually readily decomposable volatile constituents may cause or permit considerable quantities of dark, solid, scale-like deposits to accumulate as an encrustation on the bare metal walls of the chamber. In addition, the manner in which the undevolatilized polymeric compositions are quite commonly introduced into devolatilizing chambers after they have been heated to a devolatilizing temperature oftentimes permits considerable spattering and splashing of the usually frothy, devolatilizing composition itself directly on the hot, bare metal walls of the chamber. The so-occasioned spatter itself is also subject to decomposition on the chamber walls. This may add significantly to the undesirable accumulation of deposits thereon.

The polymeric compositions that are being devolatilized thus may frequently be seriously and intolerably contaminated with fallen specks or flakes of the generally carbonaceous deposits that have become dislodged and which have flaked off during operation of the apparatus. As might be expected, deposits that have accumulated on heavily-laden, non-vertical overhead surfaces in the devolatilizing chamber may, in the usual case, often engender and be responsible for the worst flake-off of the deposits during operation of ordinarily employed devolatilizing appliances, in which types of equipment, incidentally, the situation is particularly prevalent and vexatious when polystyrene and the like are being processed.

It would be an advantage of salient significance to provide an improved apparatus for devolatilizing which, while being capable of functioning in a most satisfactory and efficient manner, would have a pronounced non-proclivity for becoming involved with difficulties of the indicated kind.

This may be readily achieved with an improvement in apparatus for devolatilizing that is embodied in accordance with the present invention which essentially comprises a devolatilizing chamber for a liquid polymeric composition that is to be devolatilized, said chamber being adapted to maintain said liquid polymeric composition at a predetermined level therein; a positively cooled overhead dome on said chamber for condensing at least a portion of the volatile constituents escaping from the polymeric composition being devolatilized in said chamber, said dome diverging outwardly and downwardly to enclose said chamber and form a vapor space thereover with the lowermost peripheral edge of the dome extending clear of and at least about as low as the upper peripheral edge of the chamber walls; means at the bottom peripheral portion of said dome for collecting condensed volatiles from said dome; and means in the vapor space within said dome, above the level of said polymeric composition that is adapted to be maintained in said chamber, for centrally introducing the polymeric composition to be devolatilized in a free-falling stream into said chamber.

The apparatus, beneficially, may also comprise means for heating the polymeric composition to an efficient devolatilizing temperature immediately prior to its central introduction in the vapor space over the polymer liquid level in the chamber. Means may also be beneficially included in the apparatus for restraining or preventing the hot, undevolatilized composition from flashing, vaporizing or devolatilizing until its introduction into the vapor space over the chamber wherein it is free to devolatilize.

The apparatus may also be provided with heating means for maintaining the portion of the walls of said chamber that are above the liquid level of said composition beneath a decomposing temperature for said volatile constituents and the portion of the walls of said chamber below said liquid level at a flowing temperature for said polymeric composition.

The means for centrally introducing the undevolatilized polymeric composition to said chamber may advantageously be a vertically disposed nozzle, conduct or down pipe which, if desired, may depend from said overhead dome and extend into said vapor space to terminate and discharge above the liquid level of the polymer composition being maintained in the devolatilizing chamber. Of course, non-vertical conducts, centrally discharging in an analogous manner, may also be utilized for introducing the undevolatilized polymeric composition. With frequently greater advantage, the means for introducing the undevolatilized composition may simply be an overhead opening or aperture in or through said dome that terminates about flush with the lower inner surface in the apex of the dome. With either arrangement, it is beneficial for the composition to be introduced through a pressure-dropping orifice that restrains the hot, undevolatilized composition from vaporizing until it is actually passed into the vapor space. A variable orifice for this purpose may facilitate the easier accommodation of varying flow rates in the undevolatilized polymer composition.

The non-decomposing wall surface in the devolatilizing chamber, coupled with the purposive and positively condensing overhead dome and the substantially non-spattering feed of the undevolatilized polymeric composition minimizes to the vanishing point the possibility for decomposition on hot, bare metal walls on which there is great likelihood of accumulating troublesome deposits and from which easy dislodgment and flake-off of such deposits may occur. Thus, serious contamination of the polymer is effectively minimized or completely avoided.

Figure 2:
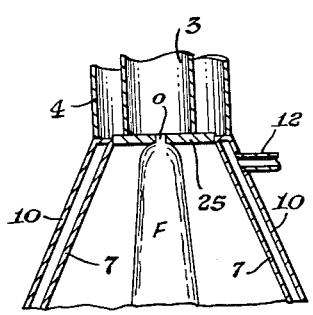

The accompanying drawings is schematically illustrative of suitable embodiments of improved apparatus for devolatilizing that is in accordance with the present invention and which includes additional features and advantages pursuant thereto. In FIGURE 1 of the drawing, an apparatus is shown in a sectional elevation. FIGURE 2, a fragmentary sectional view, depicts a modified embodiment of the apparatus.

The improved apparatus for devolatilizing, indicated generally by the reference numeral 1, may advantageously consist of a devolatilizing chamber body 15 enclosed by an overhead condensing dome 7 that diverges downwardly to extend lower than the walls of the chamber body 15 so as to enclose the chamber. A vertical down pipe or inlet nozzle 3 leads to the top of the dome 7 and may actually extend into the vapor space within the dome 7. The down pipe 3 is utilized for introducing the undevolatilized polymer composition that is heated to an appropriate elevated temperature for devolatilization. As shown, the down pipe 3 is terminated by or with the orifice plate or cap 25 containing the outlet orifice O which is located above the liquid lever 14 of the polymer in the chamber 15. The down pipe 3 discharges the undevolatilized polymer composition through the orifice to feed directly into the chamber in a non-spattering manner as a free falling, frothy, relatively thick stream F of devolatilizing polymer. Preferably, the down pipe 3 is relatively short so as to project only a minimum distance into the vapor space. Or, as shown in FIGURE 2, it may not actually enter the dome but may terminate with the orifice plate 25 being flush with the inner, upper surface of the dome.

Usually, the heated, undevolatilized polymer composition is in a viscous condition and foams considerably with release of pressure from it. By discharging it for devolatilization in a free-falling mass or stream in the indicated manner, it is effectively prevented from spattering and splashing during its feed to the devolatilizing chamber or pot of the apparatus. Of course, under certain circumstances, the down pipe may not need to terminate in a pronounced orifice when its own dimensions are adapted to provide the desired effect.

Advantageously, as shown, the down pipe 3 is connected directly with a heat-exchanging unit of a suitable type, indicated generally by the reference numeral 2, for heating the undevolatilized polymer to a devolatilizing temperature. A tubular heat exchanger is frequently well suited for this purpose. The down pipe 3 may also extend through an auxiliary heating jacket or spool 4 before passing through the dome 7 to project into the vapor space above the devolatilization chamber. A suitable heat-exchanging fluid may be admitted to and withdrawn from the spool jacket 4 through the inlet and outlet connections 5 and 6, respectively. It is desirable to maintain the undevolatilized polymer under a sufficient pressure to prevent its vaporization in the down pipe 3 before it is introduced into the vapor space. As indicated, the orifice O may be suitably sized to effect a sufficient drop in the flowing polymer to achieve this desideration. And, as has been mentioned, the orifice O may be of the continuously and automatically variable type or of the type that is variable by manual setting to best accommodate continuously or intermittently changing flow rates. The pressure restraining effect of the orifice O avoids the possibility of decomposition and consequent dirt and contamination from occurring in the down pipe (due to contact by vapors of hot metal in the pipe) before the undevolatilized composition is even admitted to the devolatilizer proper.

The overhead condensing dome 7 may advantageously, as depicted, be arranged in a downwardly funneled or downwardly and outwardly flaring configuration. It may have a pyramidal or conical contour or may also be otherwise shaped, as by having more arcuate and curvilinear architecture. A circumferential collecting trough 8, emptied through an outlet 9, is provided along the lower edge of the dome periphery to collect the condensed volatiles that run down the interior surface of the dome 7. The condensate outlet 9 may advantageously be in communication with a suitable vacuum source or other evacuating means (not shown) and, if desired, a recovery system.

While, in certain instances, the dome 7 may be air cooled, it is usually preferable to utilize more positive cooling means for the condensation. To this end, the dome 7 may be provided with a jacket 10 for water or other suitable coolant. Inlet and outlet connections 11 and 12 on the jacket 10 are used for circulation of the coolant. It is not necessary to achieve total condensation of the escaping volatiles on the dome although, if desired, such a manner of operation may be effected. Partial condensation may, in many instances, be quite satisfactory. It is merely necessary to maintain the dome 7 at a sufficiently low temperature so that it is continuously sweating or wet with the portion of the escaping volatiles that condense upon and run down its interior surface. In this connection, commensurate good results may be achieved when the temperature of the dome 7 is such that the vapor space in the upper portion of the devolatilizing chamber is being maintained either above, at, or below the dew point of the escaping volatiles.

The devolatilizing chamber 15 may also be jacketed with advantage to maintain its side walls at an optimum thermal condition. Thus, a heating jacket 16, having inlet and outlet connections 17 and 18, respectively, may be provided about the side walls of the devolatilizing chamber. It is usually preferable to thus maintain the side walls at a flowing temperature for the devolatilized polymer composition. Although only a single heat-exchanging jacket is shown about the chamber 15, it is obvious that several individual jackets may be utilized in order to keep various portions of the chamber side walls at different desired temperatures. Thus, separate heat exchanging means above the approximate liquid level of the polymer in chamber 15 may be utilized to maintain the upper portion of the side walls below a decomposition temperature and either above or below a condensing temperature for the escaping volatiles. The devolatilized polymeric composition is transferred from the bottom of the chamber body 15, by means of a pump or other forwarding device 23, which is in or at the bottom of the chamber, to an extruder (not shown) or other suitable subsequent handling means.

As is apparent, the volatile constituents escaping from the polymeric composition may be partially or totally condensed upon and collected from the dome without contacting large areas of bare metal in the apparatus under conditions that are conducive to their decomposition. Likewise, very litle, if any, wall spattering is occasioned by the introduction of the undevolatilized polymer composition. As a consequence, there is a preclusion of readily dislodgeable deposit formation during operation of the apparatus. Only the exterior surface of the polymer-introducing down pipe or the orifice plate or cap at its end may thus have any tendency to accumulate deposits. And, especially when the down pipe is in a vertical disposition or is very short or terminates flush with the dome, its limited area and positioning are such that it generally does not constitute an intolerable source of polymer contamination. In this connection, a flushly terminating down pipe can generally be arranged to be practically completely covered, save for its discharging outlet or orifice, by the condensing surface of the dome. This generally about eliminates even this source of contamination. It is advantageous, of course, to periodically clean any exposed outer surface of the down pipe in the vapor space during operation of the apparatus ensure an effective control of deposit formation on even this minor surface in the devolatilizer. It is usually desirable to fabricate apparatus in accordance with the invention with aluminum or a corrosion-resisting variety of steel.

Embodiments of apparatus within the comprehension of the present invention with both shortly projecting and flushly terminating down pipes have been used for as long as six months to successfully devolatilize a partially polymerized polystyrene composition containing about 70 percent by weight of polymer solids without formation of intolerable interior deposits. Only the exterior of the apparatus with a short projecting nipple of the down pipe was noted during this period to have any noticeable accumulation. This was easily cleanable at intervals of about one month, which was sufficient to avoid flake-off therefrom. In the embodiments with the flushly terminating down pipe this precaution was unnecessary. In the operation, the undevolatilized polymer was admitted at about 225° C. through discharge orifices that maintained it under a non-vaporizing pressure until its actual introduction into the vapor space; the dome was water cooled and maintained at about 65° C., the jacketed wall of the devolatilizing chamber at about 250° C., and an absolute mercury pressure of about 150 millimeters effected in the apparatus. The liquid level of the polymer was maintained about even with the chamber walls. An excellent, substantially uncontaminated and exceptionally uniform polystyrene product was consistently obtained. At the end of this period, all the inner surfaces excepting the exposed terminating exterior of the polymer feeding down pipe in the vapor space were found to be bright and shiny and in as clean a condition as upon installation. In contrast, a conventional devolatilizer operating with inner bare surface temperatures of about 200–220° C. to devolatilize molten polymer at 180–200° C. was found to quickly form heavy deposits over its entire, exposed, hot inner surface. At the end of four months, a complete heavy encrustation had developed.

Devolatilizing apparatus in accordance with the present invention may advantageously be utilized with many other varieties of polymer compositions. As is apparent, many changes and modifications can be entered into the practice of the invention without departing in substance from its intended spirit and scope, as it is set forth in the claims that are appended hereto.

What is claimed is:

1. Improved apparatus for devolatilizing polymeric compositions which comprises a devolatilizing chamber for a liquid polymeric composition that is to be devolatilized, said chamber being adapted to maintain said liquid polymeric composition at a substantially constant level therein; a positively cooled overhead dome on said chamber for condensing volatile constituents escaping from the polymeric composition being devolatilized in said chamber, said dome diverging outwardly and downwardly continuously from its top to bottom to enclose said chamber and form a vapor space thereover with the lowermost peripheral edge of the dome extending clear of and at least about as low as the upper peripheral edge of the chamber walls; means at the bottom peripheral portion of said dome for collecting condensed volatiles from said dome; and means in the vapor space within said dome above the level of the polymeric composition that is adapted to be maintained in said chamber for centrally introducing the polymeric composition to be devolatilized in a free-falling and non-spattering stream into said chamber.

2. The apparatus of claim 1, wherein the means for introducing said polymeric composition to be devolatilized is a vertically disposed conduit depending from said overhead dome and extending through said vapor space to terminate and discharge above the liquid level of the polymer composition that is adapted to be maintained in said chamber.

3. The apparatus of claim 2, and including a pressure dropping orifice at the discharge end of said conduit that is adapted to restrain the undevolatilized polymeric composition from vaporizing until it is actually introduced into said vapor space.

4. The apparatus of claim 1, wherein the means for introducing said polymeric composition to be devolatilized is a flushly arranged opening in the upper portion of said overhead dome for discharging the polymer composition that is adapted to be maintained in said chamber.

5. The apparatus of claim 4, wherein said flush opening is a pressure dropping orifice that is adapted to restrain the undevolatilized polymeric composition from vaporizing until it is actually introduced into said vapor space.

6. The apparatus of claim 1 and additionally including heating means for the walls of said devolatilizing chamber.

7. The apparatus of claim 1, wherein the means for collecting condensed volatiles from said dome is an encircling trough formed at the lowermost peripheral edge of said dome.

8. The apparatus of claim 1, wherein said dome has a downwardly and outwardly flaring conical configuration.

9. The apparatus of claim 1, wherein said dome has a downwardly and outwardly flaring pyramidal configuration.

10. The apparatus of claim 1, wherein said dome is water cooled.

References Cited in the file of this patent

UNITED STATES PATENTS

| 516,924 | Du Pont | Mar. 20, 1894 |
| 2,037,006 | Clayton | Apr. 14, 1936 |
| 2,274,802 | Mills | Mar. 3, 1942 |
| 2,475,639 | Rainwater | July 12, 1949 |
| 2,514,207 | Johnson | July 4, 1950 |
| 2,530,409 | Stober et al. | Nov. 21, 1950 |
| 2,575,051 | Egger et al. | Nov. 13, 1951 |

FOREIGN PATENTS

| 803 | Great Britain | Mar. 2, 1895 |